Sept. 15, 1942. O. OPPENLAENDER Re. 22,178
MANUFACTURE OF RAYON AND THE LIKE
Original Filed Sept. 28, 1935
Fig. 1,
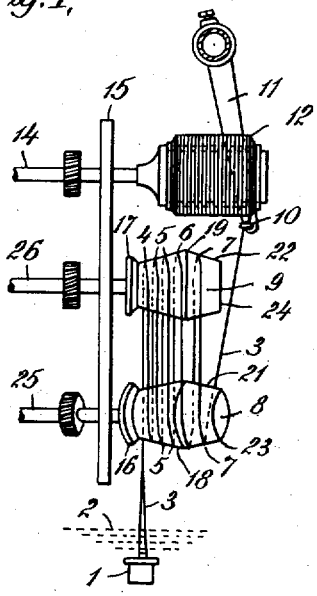
Fig. 2,
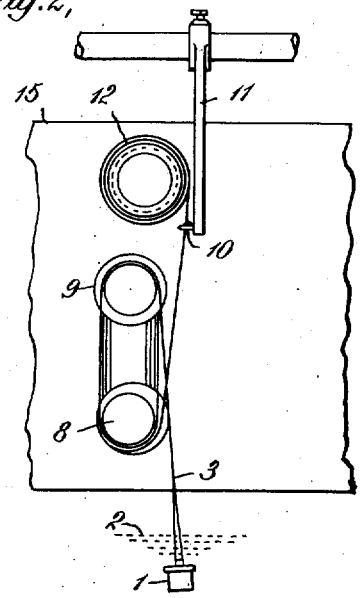
Fig. 3,
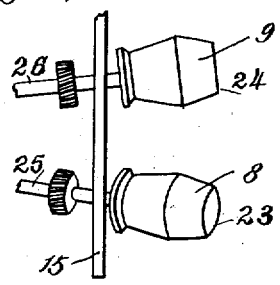
Fig. 4,
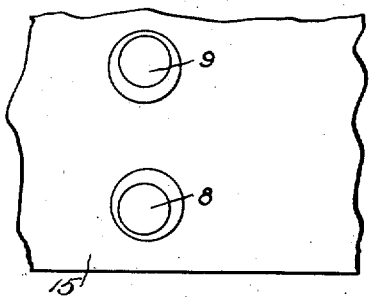
Fig. 5,
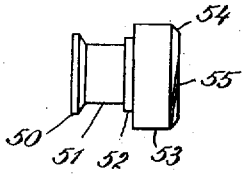
Fig. 6,
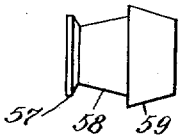
Fig. 7.
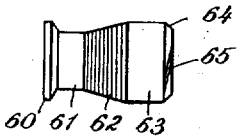
INVENTOR
Oskar Oppenlaender
BY
Pennie, Davis, Marvin & Edmonds
ATTORNEYS Reissued Sept. 15, 1942

Re. 22,178

UNITED STATES PATENT OFFICE 22,178

MANUFACTURE OF RAYON AND THE LIKE

Oskar Oppenlaender, Stuttgart, Germany, assignor, by mesne assignments, to American Enka Corporation, Enka, N. C., a corporation of Delaware Original No. 2,107,451, dated February 8, 1938, Serial No. 42,604, September 28, 1935. Application for reissue March 5, 1940, Serial No. 322,279½

8 Claims. (Cl. 18—8)

This invention relates to the manufacture of rayon and the like, and more particularly to the operation of stretch-spinning, wherein a semi-coagulated product, for example artificial silk, artificial horsehair, artificial human hair, ribbons, casings, etc., is placed under substantial stretching tension in its path from spinnerette or nozzle to a collecting device.

The method of the invention contemplates a step-wise stretching of rayon filaments and the like, for example thread (composed of a plurality of filaments) under substantial tension with a resulting improvement in the uniformity of dernier, tensile strength and dyeing properties. In accordance with a preferred practice of the invention, the filaments are passed from a spinnerette and combined into a thread which is looped over a plurality of power-driven rotors so constructed and arranged that the loop advances along the rotors with increasing tension. In effect a plurality of loops is formed, each succeeding loop being under such a tension in regard to the rotor surface tension as to prevent thread slippage. The thread is materially stretched as it advances, and as a result of the operation a step-wise and substantial stretching is effected. The thread thus stretched may, if desired, be fed to a suitable winding bobbin or other appropriate collecting device. In its more complete aspects, the invention contemplates step-wise and substantially stretching the thread, while in a semi-coagulated or plastic state, and then permitting the thread to contract under tension, prior to the subsequent collecting operation.

The apparatus of the invention includes a plurality of power-driven rotors for imparting a step-wise and substantial stretching to the rayon thread and the like as it travels from a spinnerette to a suitable collecting device. A preferred form of apparatus comprises two rotors so constructed or mounted that thread looped thereon will advance along the surfaces thereof and stretch in steps as it advances. The distance between the opposite thread-contacting peripheral surfaces of the rotors increases from a minimum distance adjacent a point where the loop of thread from the spinnerette first engages the rotors (point of initial stretching) to a maximum distance adjacent a point where the loop undergoes final stretching (point of maximum desired stretching) and then preferably decreases in the direction of the rotor ends (where the loop last contacts the rotors in its travel to the collecting device). The axes of rotation of the rotors may be oblique to each other but in parallel planes, in which case one (or both) of the rotors is so formed that its peripheral surfaces progressively increases from a relatively small diameter adjacent the point of initial stretching to a maximum diameter adjacent the point of maximum stretching. This may get accomplished by employing a rotor of conical form or one comprising a plurality of cylindrical sections that progressively increase in diameter in the direction of the point of maximum stretching. To accomplish a contraction of the thread after the desired maximum stretching has been attained, one or both of the rotors is preferably tapered from its maximum diameter. The apparatus thus makes possible a progressive stretching of the thread to a maximum and controlled contraction.

The conical surfaces of the rotors may be serrated to prevent lateral sliding of the thread and the conical end portion of one rotor is preferably grooved to facilitate the disposal of thread collected thereon during doffing. The axes of the rotors are angularly displaced sufficiently to impart the desired advancement or spacing of the thread loops upon the rotors. In the preferred practice of the invention, the rotors are of substantially the same diameters and rotate at the same speed (R. P. M.).

The apparatus of the invention obviates thread guides such as rods, rollers, etc., and prevents adverse and irregular interference of the stretching operation upon the preceding step of filament extrusion and upon the subsequent step of thread collecting.

The principles of the invention and their practical applications will be better understood from the following description taken in conjunction with the accompanying drawing, in which Fig. 1 is a side elevation of an apparatus embodying the invention;

Fig. 2 is a front elevation of the apparatus shown in Fig. 1;

Fig. 3 is a side elevation showing another arrangement of the rotors of Fig. 1;

Fig. 4 is a front elevation of the apparatus shown in Fig. 3; and

Figs. 5, 6, and 7 illustrate various forms of rotors adapted for the practice of the invention.

In general, the apparatus illustrated in Figs. 1, 2, 3, and 4 of the drawing comprises a spinnerette 1 positioned in an appropriate coagulating bath 2. The thread 3, consisting of a group of extruded and freshly coagulated filaments and the like, is passed upwardly and looped over the power-driven rotors (hereinafter described in detail) which are constructed and arranged to cause the loop to progressively advance along the surfaces thereof, forming in effect a plurality of loops or slings comprising an initial stretching loop 4, one or more intermediate loops 5, a maximum stretching loop 6, and one or more contraction loops 7. The thread 3 is then passed from the rotor on which it is last engaged through a winding guide 10 actuated by suitable mechanism 11 and wound on bobbin 12 which is rotated by the gear-driven shaft 14 mounted upon an upright supporting member 15. Instead of using winding bobbins, other appropriate collecting devices may be used such, for example as spinning pots, etc.

Referring to the apparatus illustrated in Figs. 1 and 2 of the drawing, each of the rotors 8 and 9 is provided with end flanges 16 and 17 (respectively) to prevent displacement of the thread, truncated conical sections 18 and 19, the smallest diameters of which are adjacent the flanges 16 and 17, and reverse truncated conical sections 21 and 22 tapering in the direction of their free ends 23 and 24, respectively. The rotors 8 and 9 are secured to the rotatably mounted and gear-driven shafts 25 and 26, respectively, positioned above and in suitable proximity to the spinnerette 1.

The corresponding sections of the rotors 8 and 9 are preferably of similar diameter, and the rotors are rotated at substantially the same speed (R. P. M.) by suitable power means (not shown). In this adaptation of the invention the axes of rotors 8 and 9 are in parallel (horizontal) planes, although not in the same vertical plane. Thus, the axis about which rotor 8 revolves inclines forwardly (as viewed in Fig. 1) with respect to the axis of rotation of rotor 9, thereby imparting a proper advancement of the loop or spacing of the several loops of thread. The rotor arrangement illustrated in Figs. 1 and 2 may be modified, however, by mounting the rotors so that the axis of each diverges from parallel planes in the direction of their conical end portions in a manner similar to the rotor mounting illustrated in Figs. 3 and 4.

In accordance with the preferred operations of the apparatus shown in Figs. 1 and 2, the thread 3 or the like is passed over the conical surface of the rotor 9 at a point adjacent the flange 17 and then over the conical surface of the rotor 8, thus forming the initial loop 4. By reason of the angular inclination of the axes of the rotors 8 and 9, the loop 4 contacts the conical surface 18 of the rotor 8 at a point of greater diameter than the point of initial contact with the conical surface of the rotor 9. Thus, the thread is stretched between its contacts with the two rotors 9 and 8. The contact diameters of the rotors and the angular inclination of the shafts 25 and 26 determine the extent of advancement of the thread loops and the number of intermediate loops 5. Each successive loop on a larger diameter of contact imparts an added amount of stretching to the yarn, the final or maximum stretching occurring in loop 6 where the thread contacts the rotor surfaces at substantially their points of maximum diameter.

It is advantageous that the thread is permitted to contract after the maximum desired stretching has been attained, and this is accomplished in accordance with the invention by forming one or more contraction loops 7 as desired over the reverse conical surfaces 21 and 22. The final contraction loop 7 is preferably passed around the conical surface 21 of the rotor 8 last, and then upwardly through the winding guide 10 and wound on the bobbin 12. Thus, the operation in its entirety effects a progressive and step-by-step stretching of the thread followed by a controlled (and progressive if desired) contraction.

The foremost part of the conical surface 21 (of rotor 8) may be used for collecting the thread while the filled collecting device (e. g. bobbin 12) is doffed, thus obviating threading-up of the rotor pair after each doff of the collecting device.

In the arrangement or mounting of the rotors illustrated in Figs. 3 and 4, the rotors 8 and 9 are mounted upon the gear-driven shafts 25 and 26. With the exception of the arrangement of the shafts, the apparatus is similar to that of Figs. 1 and 2. The shafts are so mounted that their axes diverge outwardly in the direction of the rotor free ends 23 and 24, and one of the shafts, for example the lower one 25 is inclined from the vertical plane embracing shaft 26. The thread will advance in the direction of the free ends of the rotors, notwithstanding the divergence of the shafts, as a result of a suitable angular displacement of one shaft with respect to the other.

The rotors of the invention may be mounted on shafts the axes of which are inclined or diverge as shown in Figs. 1 to 4, and the spacing of the loops over the rotor surfaces may be determined by suitably inclining the shafts with respect to each other.

The rotors illustrated in Figs. 5, 6 and 7 show, by way of example, various forms of rotors adapted for practicing the invention.

The rotor shown in Fig. 5 has a flange 50, relatively small cylindrical section 51, larger cylindrical section 52, maximum cylindrical section 53, and conically tapering end 54 in which is cut a groove 55 serving to facilitate the disposal of thread collected during the short doffing period. The relative lengths, diameters, and number of the cylindrical sections are merely illustrative and other arrangements as to number and relating proportions of the rotor sections may be made. When this type of rotor is employed, the successive loops of the thread are passed from cylinder to cylinder and thereby progressive increments of stretch are effected.

The rotor shown in Fig. 6 comprises a flange 57, intermediate truncated conical section 58 and reverse truncated conical section 59 of larger diameter.

The rotor shown in Fig. 7 comprises a flange 60, relatively small cylindrical section 61, intermediate conical section 62 having a finely and bluntly serrated surface to prevent lateral sliding of the thread loops and to increase the grip of the thread on the rotors perpendicularly to their axes. The rotor is provided with a relatively large cylindrical section 63 merging at its respective ends with the intermediate conical section 62 and with a second conical section 64, having a groove 65 therein for collecting thread during doffing.

It is contemplated that any of the rotor surfaces of the various forms of rotors illustrated may be serrated as shown in Fig. 7 to prevent the lateral displacement of the thread and to increase the grip on the rotor.

In accordance with the invention, rayon and the like is stretched progressively or in relatively small increments to a desired maximum extent, thus improving uniformity of yarn properties as influenced by substantial stretching. The loops prevent slipping of the thread on the rotor surfaces. The detrimental use of thread guides (such as rods, rollers, etc.) while stretching the thread under substantial tension is obviated. The thread may also be permitted to contract while under looping tension with resultant improvements in the properties of the yarn. The thread-stretching agencies of the invention are power-driven, thereby securing dependable (as well as adjustable) contact of friction between thread and rotated surfaces, and simultaneously obviating thread guides, thereby definitely preventing adverse and irregular interference of the operation of substantial stretching upon the preceding step of filament extrusion and upon the subsequent step of thread collecting, essential for procuring products of uniform quality.

I claim:

1. In apparatus for spinning rayon and the like, the combination with a spinnerette and a collecting device of a plurality of power-driven rotors over which the thread is looped in its travel from the spinnerette to the collecting device, said rotors having serrated surfaces of conical form and being fixedly mounted in spaced relation to each other on separate shafts.

2. In apparatus for spinning rayon and the like, the combination with a spinnerette and a collecting device of a plurality of power-driven rotors over which the thread is looped in its travel from the spinnerette to the collecting device, and means on one of said rotors for collecting thread during doffing of said collecting device.

3. In apparatus for spinning rayon and the like, the combination with a spinnerette and a collecting device of a plurality of power-driven rotors over which the thread is looped in its travel from the spinnerette to the collecting device, each of said rotors having a plurality of cylindrical sections of different diameters and being mounted on a shaft the axis of which inclines with respect to the axis of the shaft upon which the other rotor is mounted.

4. In apparatus for spinning rayon and the like, the improvement which comprises two power driven shafts, the axes of which diverge and also embrace planes inclined to each other, and a rotor mounted on each shaft, said rotors being so constructed and arranged that a thread may be passed from a spinnerette and looped a plurality of times over the rotors and the velocity of thread travel increased from loop to loop whereby the thread is progressively stretched, the distance between opposite thread-contacting peripheral surfaces of the rotors increasing from a minimum near a point where the thread form the spinnerette first engages the rotors to a maximum near a point where the thread undergoes a final stretching.

5. In apparatus for spinning rayon and the like, the combination with a spinnerette and a collecting device of two power driven shafts, and a rotor fixedly mounted on each shaft, each of said rotors having a flange at one end, and a plurality of cylindrical sections of progressively increasing diameters whereby thread may be looped over the cylindrical sections and given a step-wise and substantial stretching in its travel over the rotors.

6. In apparatus for spinning rayon and the like, the combination with a spinnerette and a collecting device of two power driven shafts, and a rotor mounted on one end-portion of each shaft, said shafts being so mounted that the distance between the axes thereof increases in the direction of the end-portions on which the rotors are mounted, each of said rotors having a flange at one end, a central conical section the small diameter portion of which is adjacent the flange and a second conical section tapering in the direction of the opposite end of the rotor and being driven by the shafts at the same peripheral speeds.

7. In apparatus for spinning rayon and the like, the combination with a spinnerette and a collecting device of two power driven shafts, and a rotor fixedly mounted on one end-portion of each shaft, said shafts being so mounted that the distance between the axes thereof increases in the direction of the end-portions on which the rotors are mounted, each of said rotors having a thread-contacting surface of progressively increasing diameter in the direction of thread advancement and being driven by the shafts at the same peripheral speeds, whereby the thread is given a progressive step-wise and substantial stretching in its travel over the rotors.

8. In apparatus for spinning rayon thread and the like, the combination with a spinnerette and a collecting device of a plurality of rotors capable of advancing the thread laterally thereof at least one of which is power-driven, each rotor having a conical surface increasing in diameter in the direction of thread travel and over which the thread is looped a plurality of times in its travel from the spinnerette to the collecting device, said rotors being mounted in spaced relation to each other on separate shafts which incline with respect to each other sufficiently to cause the thread to advance over the conical surfaces.

OSKAR OPPENLAENDER.